United States Patent
Yamaguchi et al.

(10) Patent No.: US 7,568,112 B2
(45) Date of Patent: Jul. 28, 2009

(54) DATA ACCESS CONTROL METHOD FOR TAMPER RESISTANT MICROPROCESSOR USING CACHE MEMORY

(75) Inventors: Kensaku Yamaguchi, Yokohama (JP); Mikio Hashimoto, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 602 days.

(21) Appl. No.: 10/754,571

(22) Filed: Jan. 12, 2004

(65) Prior Publication Data

US 2004/0143748 A1 Jul. 22, 2004

(30) Foreign Application Priority Data

Jan. 21, 2003 (JP) .............. 2003-012558

(51) Int. Cl.
*G06F 11/30* (2006.01)
*G06F 12/14* (2006.01)

(52) U.S. Cl. ............ 713/190; 713/187; 713/188; 713/194; 711/125; 711/118

(58) Field of Classification Search ........... 711/125, 711/118; 713/187, 188, 190, 194
See application file for complete search history.

(56) References Cited

U.S. PATENT DOCUMENTS

| | | | |
|---|---|---|---|
| 4,558,176 A | | 12/1985 | Arnold et al. |
| 5,224,166 A | * | 6/1993 | Hartman, Jr. ............ 713/190 |
| 5,666,411 A | | 9/1997 | McCarty |
| 5,825,878 A | * | 10/1998 | Takahashi et al. ......... 713/190 |
| 5,943,421 A | * | 8/1999 | Grabon ................. 380/269 |
| 6,175,924 B1 | * | 1/2001 | Arnold ................. 713/189 |
| 6,523,118 B1 | * | 2/2003 | Buer .................. 713/189 |
| 6,895,506 B1 | * | 5/2005 | Abu-Husein ........... 713/193 |
| 6,965,977 B2 | * | 11/2005 | Yi .................... 711/169 |
| 6,993,130 B1 | * | 1/2006 | Fernandez et al. ........ 380/46 |
| 6,993,654 B2 | * | 1/2006 | Seki et al. ............. 713/172 |

(Continued)

FOREIGN PATENT DOCUMENTS

JP 2002-232417 8/2002

(Continued)

OTHER PUBLICATIONS

D. Lie, et al., Proceedings of ASPLOS 2000, 10 pages, "Architectural Support for Copy and Tamper Resistant Software", Nov. 2000.

(Continued)

*Primary Examiner*—Taghi T. Arani
*Assistant Examiner*—James Turchen
(74) *Attorney, Agent, or Firm*—Oblon, Spivak, McClelland, Maier & Neustadt, P.C.

(57) ABSTRACT

In a tamper resistant microprocessor having a cache memory, the cache memory stores the decrypted execution code or data into one of cache lines provided in the cache memory, each cache line having a secret protection attribute holding section for storing an actual encryption key used in decrypting the execution code or data, and a cache memory control unit processes a reading request for the execution code or data such that, if the execution code or data exists in the cache memory and the execution code or data in the cache memory is decrypted by an identical encryption key as the prescribed encryption key, the execution code or data in the cache memory is read out.

8 Claims, 9 Drawing Sheets

U.S. PATENT DOCUMENTS

| | | | |
|---|---|---|---|
| 7,036,017 B2 * | 4/2006 | Gammel et al. | 713/189 |
| 2001/0018736 A1 * | 8/2001 | Hashimoto et al. | 713/1 |
| 2002/0051536 A1 * | 5/2002 | Shirakawa et al. | 380/45 |
| 2002/0138722 A1 * | 9/2002 | Douceur et al. | 713/153 |
| 2002/0191793 A1 * | 12/2002 | Anand et al. | 380/255 |
| 2003/0126458 A1 * | 7/2003 | Teramoto et al. | 713/194 |
| 2003/0196102 A1 * | 10/2003 | McCarroll | 713/194 |
| 2004/0093505 A1 * | 5/2004 | Hatakeyama et al. | 713/189 |
| 2004/0117639 A1 * | 6/2004 | Mowery | 713/187 |
| 2004/0123132 A1 * | 6/2004 | Montgomery et al. | 713/200 |
| 2005/0071651 A1 * | 3/2005 | Aguilar et al. | 713/189 |

FOREIGN PATENT DOCUMENTS

| | | | |
|---|---|---|---|
| JP | 2002232417 A | * | 8/2002 |

OTHER PUBLICATIONS

U.S. Appl. No. 09/748,017, filed Dec. 27, 2000, Takabatake et al.
U.S. Appl. No. 09/781,284, filed Feb. 13, 2001, Hashimoto et al.
U.S. Appl. No. 09/984,407, filed Oct. 30, 2001, Shirakawa et al.
U.S. Appl. No. 10/028,794, filed Dec. 28, 2001, Teramoto et al.
U.S. Appl. No. 10/059,217, filed Jan. 31, 2002, Hashimoto et al.
U.S. Appl. No. 10/214,197, filed Aug. 8, 2002, Fujimoto et al.
U.S. Appl. No. 10/259,379, filed Sep. 30, 2002, Hashimoto et al.
U.S. Appl. No. 10/394,175, filed Mar. 24, 2003, Jinmei et al.
U.S. Appl. No. 10/608,113, filed Jun. 30, 2003, Yamaguchi et al.
U.S. Appl. No. 11/060,704, filed Feb. 18, 2005, Haruki et al.
U.S. Appl. No. 10/913,537, filed Aug. 9, 2004, Hashimoto et al.

* cited by examiner

FIG. 5

| PROGRAM | EXECUTION CODE OR DATA | KEY |
|---|---|---|
| 1 | A | X |
|   | B | X |
|   | C | X |
| 2 | D | Y |
|   | E | Y |
|   | F | Y |

DATA ACCESS CONTROL METHOD FOR TAMPER RESISTANT MICROPROCESSOR USING CACHE MEMORY

BACKGROUND OF THE INVENTION

1. Field of the Invention

The present invention relates to a data access control method in a tamper resistant microprocessor and a cache memory implemented processor having a function for supporting the multi-task program execution environment, a cache memory control unit and encryption/decryption function so as to realize the protection of secrecy and the prevention of alteration for the execution codes of the programs and the processing target data.

2. Description of the Related Art

In the computer systems of recent years, the open system that can be constructed by combining hardware and software of various makers has been widespread, as in the case of PCs. In the open system, the information on the operating system (referred hereafter as OS) formed by hardware and system program is publicly disclosed so that it is in principle possible for a user to modify or alter the OS program according to the disclosed information The application program is operated under the management of this OS, so that when the OS itself is attacked and altered by a third person such as a hacker, there is no way of escaping from this attack. Therefore it has been difficult for the application program provider to protect the application program completely from the analysis or the alteration by the third person.

For this reason, there is a method to encrypt the application program in advance, in order to prevent the analysis and the alteration of the application program to be operated under the OS of the open system. When the program is encrypted, not only the analysis becomes difficult but also the prediction of the operation in the case where the program is altered also becomes difficult so that it is also effective for the prevention of the alteration.

However, the encrypted application program cannot be executed as it is by the existing computer, so that there is a need for a microprocessor which can execute the program while decrypting the program. This microprocessor has functions for protecting the secrecy of the program and providing protection against the analysis and the alteration by encrypting data handled by the program on the presumption that the OS may carry out hostile operations against the application program. In the following, such a microprocessor will be referred to as a tamper resistant microprocessor.

Also, this tamper resistant microprocessor provides the multi-task program execution environment for executing a plurality of protected programs simultaneously in a pseudo-parallel manner (see commonly assigned co-pending U.S. patent application Ser. Nos. 09/781,158 and 09/781,284, and David Lie, et al., "Architectural Support for Copy and Tamper Resistant Software", ASPLOS-IX Proceedings of the 9th International Conference on Architectural Support for Programming Languages and Operating Systems, Cambridge, Mass., USA, Nov. 12-15, 2000, pp. 168-177).

In the case where the cache memory is implemented on the tamper resistant processor, the encryption processing unit for carrying out encryption and decryption can be arranged between the processor core and the cache memory or between the cache memory and the memory device such as the main memory. When the encryption processing unit is arranged between the cache memory and the main memory, the plaintext contents after the decryption or before the encryption will be stored in the cache memory. For this reason, the latter arrangement is more efficient than the former arrangement because the less number of encryption/decryption processing is required by the latter arrangement.

When the encryption processing unit carries out the encryption or the decryption, if it is under the multi-task program execution environment, a plurality of programs and their data are stored in the cache memory. At this point, there are cases where the eavesdropping or the alteration of the secret information of the other program among the programs in the cache memory can occur due to the alternation of the OS by the third person. In order to prevent such a case, there is a need to limit accesses with respect to the cache memory.

In the conventionally proposed tamper resistant microprocessor, one task ID is given to each one of the programs that are operated simultaneously, and this task ID is utilized in limiting accesses with respect to the cache memory. Each cache line of the cache memory is provided with a secret protection field for storing the task ID. When the processor core stores the plaintext execution code or data into the cache memory, the task ID of the currently executed program is stored into the corresponding secret protection field. When the processor core reads out the content of the cache memory, the task ID is obtained from the secret protection field of the cache line to be read. This task ID is compared with the task ID of the currently executed program, and the reading is permitted only when they coincide.

There is a need to carry out the encryption when data stored in the cache memory is to be written into the memory device such as the main memory, but the encryption key to be used in the encryption is not necessarily the encryption key maintained by the currently executed program. In the conventionally proposed tamper resistant microprocessor, the encryption key is obtained by using the task ID stored in the secret protection field in the cache line. For this reason, a key value table for storing correspondences between the task IDs and the encryption keys is provided inside the processor.

Also, when a plurality of programs carry out cooperative operations simultaneously, there is a function for sharing data among these programs such that data cannot be read out from the other programs. In order to realize this function, one encryption key value is shared by these programs. Each program uses this one encryption key in reading or writing data, such that the contents of the shared memory region can be shared by these programs while the other programs that do not know this one encryption key cannot read or write the contents of that memory region by carrying out the encryption/decryption correctly (see Japanese Patent Application Laid Open No. 2002-202720).

However, the above described method for limiting accesses with respect to the cache memory by using the task ID is associated with the following problems.

The first problem is that the tamper resistant microprocessor that uses this method needs to maintain the key value table storing correspondences between the task IDs and the encryption keys, and the number of programs that can be activated simultaneously is limited by the size of this key value table.

The second problem is that, when the program with one task ID is finished and this task ID is assigned to another program to be newly activated, if the data of the previously executed program still remain in the cache memory, the next program to which the same task ID is assigned would become possible to read that data without knowing the encryption key. In order to avoid this, there is a need to scan the entire region of the cache memory and invalidate the cache lines corresponding to the task ID of the finishing program at a time of finishing the program, but this operation requires a long time.

This is particularly noticeable in the microprocessor implemented with the large cache memory.

The third problem is that, in the case where the memory contents are shared when a plurality of programs carry out the cooperative operations simultaneously, in order for another program to read the data written by one program, there is a need to encrypt the data written by that one program and write it into the memory device such as the main memory once, and then decrypt it and read it into the cache memory. In order words, even though it is the same data of the same content, there is a need to encrypt it once and then decrypt it by using the same key again, so that the execution speed is lowered.

The fourth problem is that the method for limiting accesses with respect to the cache memory by using the task ID requires the implementation of many functions by hardware, such as a function for looking up the key value table, a function for scanning the cache region and invalidating relevant cache lines at a time of finishing the program, etc., so that the structure of the microprocessor becomes complicated.

BRIEF SUMMARY OF THE INVENTION

It is therefore an object of the present invention to provide a data access control method by a tamper resistant microprocessor and a cache memory implemented processor, for limiting accesses with respect to the cache memory, in which there is no limit to the number of programs that can be activated simultaneously, the contents of the cache memory used by one finishing program can be made impossible to read from the other program without scanning the entire region of the cache memory, the contents written into the cache memory by one program can be read by the other program without encrypting it and writing it into the main memory when a plurality of programs read and write the shared memory region by sharing one encryption key, and the complicated hardware functions are unnecessary.

According to one aspect of the present invention there is provided a tamper resistant microprocessor, comprising: a decryption unit configured to read out an execution code or data of an encrypted program and decrypt the execution code or data by using a prescribed encryption key, according to a decryption request from the cache memory control unit; a cache memory configured to store the execution code or data decrypted by the decryption unit into one of cache lines provided in the cache memory, each cache line having a secret protection attribute holding section for storing an actual encryption key used in decrypting the execution code or data; and a cache memory control unit configured to process a reading request for the execution code or data such that, if the execution code or data exists in the cache memory and the execution code or data in the cache memory is decrypted by an identical encryption key as the prescribed encryption key, the execution code or data in the cache memory is read out.

According to another aspect of the present invention there is provided a data access control method by a cache memory implemented processor, comprising: reading out an execution code or data or an encrypted program and decrypting the execution code or data by using a prescribed encryption key, according to a decryption request; storing the execution code or data decrypted by the reading and decrypting step, into one of cache lines provided in a cache memory, each cache line having a secret protection attribute holding section for storing an actual encryption key used in decrypting the execution code or data; and processing a reading request for the execution code or data such that, if the execution code or data exists in the cache memory and the execution code or data in the cache memory is decrypted by an identical encryption key as the prescribed encryption key, the execution code or data in the cache memory is read out.

Other features and advantages of the present invention will become apparent from the following description taken in conjunction with the accompanying drawings.

BRIEF DESCRIPTION OF THE DRAWINGS

FIG. 5 is a diagram schematically showing an exemplary structure of execution codes and data to be processed by the tamper resistant microprocessor of FIG. 1.

DETAILED DESCRIPTION OF THE INVENTION

Referring now to FIG. 1 to FIG. 9, one embodiment of the data access control method by the tamper resistant microprocessor having a cache memory control unit and an encryption/decryption function for protecting secrecy and preventing alteration of the program execution code and processing target data according to the present invention will be described in detail.

<Tamper Resistant Microprocessor>

Figure 1:
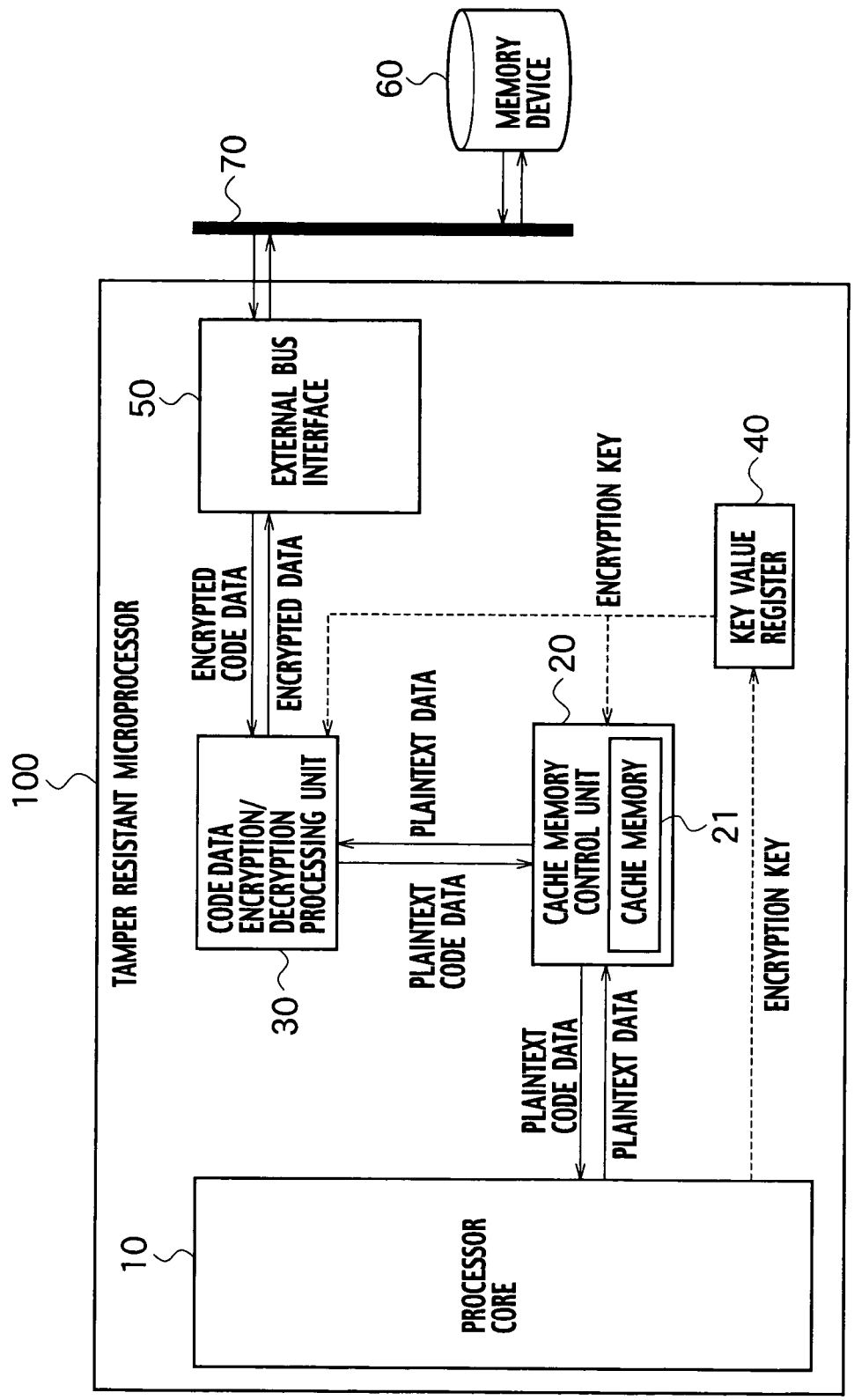
FIG. 1 is a block diagram showing a configuration of a tamper resistant microprocessor according to one embodiment of the present invention.

As shown in FIG. 1, the tamper resistant microprocessor 100 of this embodiment has a processor core 10, a cache memory control unit 20, a code data encryption/decryption processing unit 30, a key value register 40 and an external bus interface 50. The tamper resistant microprocessor 100 is connected to a memory device 60 through a bus 70 connected to the external bus interface 50.

The processor core 10 carries out the processing of the plaintext code and the plaintext data given from the cache memory control unit 20.

The code data encryption/decryption processing unit 30 is a module arranged between the cache memory control unit 20 and the external bus interface 50, for carrying out the decryption of the encrypted execution code or data transmitted from the bus 70 side. The code data encryption/decryption processing unit 30 also encrypts data received from the cache memory control unit 20 and outputs it to the bus 70 side.

The key value register 40 stores the encryption key to be used by the code data encryption/decryption processing unit 30 at a time of executing the encryption or the decryption. As shown in FIG. 5, one program comprises a plurality of execution codes and data, and these plurality of execution codes and data are encrypted or decrypted by one encryption key stored in the key value register 40.

Note that, in this embodiment, it is assumed that the execution codes and the data of the same program are encrypted by using the same encryption key, but it is also possible to make the key value register 40 to store two encryption keys for the execution codes and the data such that the execution codes and the data are encrypted by using different keys. The key value register 40 and secret protection attribute holding sections 25a to 25d shown in FIG. 2 store the same key value, so that it is preferable for the key value register 40 to have the same size as the secret protection attribute holding section. The region of the key value register 40 will be updated by overwriting the key value of a new program at a time of executing a new program.

The memory device 60 is a memory device such as a main memory for storing the execution codes and the data after the program compilation. The memory device 60 may also exchange the data with an external supplementary memory device or external bus (not shown) by using a communication control device (not shown) through the bus 70. Note that the execution codes and the data stored in the memory device 60 are assumed to be already encrypted by an external encryption processing device or the like, before being received and stored into the memory device 60.

The cache memory control unit 20 carries out control of a comparison processing, a calculation processing, etc., of address information or information such as the secret protection attribute which are associated with the execution codes and the data. The cache memory control unit 20 internally has a cache memory 21 for storing the execution codes and the data as the plaintext codes and the plaintext data.

Figure 2:
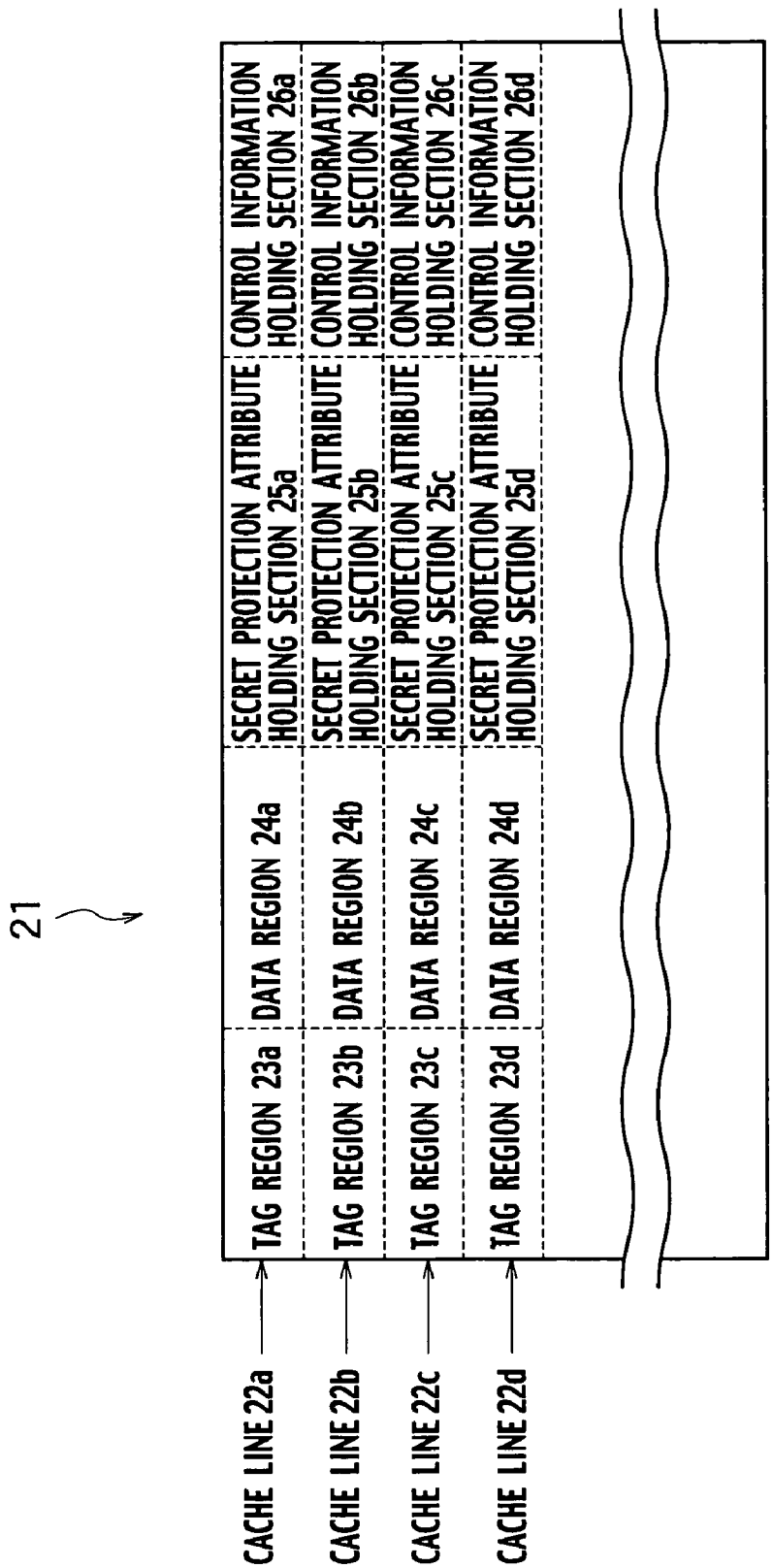
FIG. 2 is a diagram showing a data structure in a cache memory used in the tamper resistant microprocessor of FIG. 1.

FIG. 2 shows a data structure inside the cache memory 21. The cache memory 21 comprises a plurality of cache lines 22a, 22b, 22c, 22d and so on (referred hereafter as cache lines 22a to 22d). The cache lines 22a to 22d have tag regions 23a, 23b, 23c, 23d and so on (referred hereafter as tag regions 23a to 23d), data regions 24a, 24b, 24c, 24d and so on (referred hereafter as data regions 24a to 24d), secret protection attribute holding sections 25a, 25b, 25c, 25d and so on (referred hereafter as secret protection attribute holding sections 25a to 25d), and control information holding sections 26a, 26b, 26c, 26d and so on (referred hereafter as control information holding sections 26a to 26d).

The tag regions 23a to 23d are regions for storing information regarding addresses from which the execution codes and the data are read out. The data regions 24a to 24d are regions for storing the read out execution codes and data. The secret protection attribute holding sections 25a to 25d are regions for storing the encryption keys used in decrypting the execution codes and the data, which is also the encryption key to be used in encrypting the data. The control information holding sections 26a to 26d are regions for storing control information of the execution codes and the data stored in the cache lines 22a to 22d.

Next, the operations of the tamper resistant microprocessor of this embodiment at a time of the initial setting of the value in the key value register, the reading of the execution code, the reading of the data and the writing of the data will be described.

<Initial Setting of the Value in the Key Value Register>

The program loaded into the memory device 60 sets the encryption key into the key value register 40 of the tamper resistant microprocessor 100 as an initial setting of the program execution. More specifically, the data obtained by encoding the encryption key is given to the processor core 10 as a parameter, and the processor core 10 sets the given encryption key into the key value register 40. For example, as shown in FIG. 5, the key value "X" is set to the key value register 40 before executing the execution code or data "A", "B" and "C" by the program #1, and the key value "Y" is set to the key value register 40 before executing the execution code or data "D", "E" and "F" by the program #2. Else the non-encrypted execution code with the key value "0" may be inserted before "A" in FIG. 5 such that the key value is set to the key value register 40 as an operation content at a time of executing this execution code.

Note that in the case where the control is shifted to the other program as the execution is interrupted by the interruption or the like during the execution of the encrypted program, the value of the key value register is saved as a part of the ordinary context saving operation. Also, at a time of resuming the execution of the interrupted program, the value of the key value register is recovered as a part of the ordinary context recovery operation. Here, the context may be encrypted. By saving the value of the key value register as the context, it is possible to realize the multi-task program execution environment in which a plurality of programs encrypted by using different encryption keys are executed simultaneously in a pseudo-parallel manner.

As a control at a time of turning on the power of the tamper resistant processor 100 or immediately after the reset and immediately after the context saving (except for the case where another context recovery is carried out immediately after the context saving), the tamper resistant microprocessor 100 sets a special value to the key value register 40. This can be realized by using an encryption key with a value "0", or using one bit of the key value register as a flag. When such a special value is set to the key value register 40, the tamper resistant microprocessor 100 executes the execution code read out from the memory device 60 without carrying out the decryption. In this way, it becomes possible for the programmer to freely decide whether a program should be encrypted or not, or specify which parts of a program should be encrypted and at which timing the encryption/decryption should be carried out.

After the encryption key is set to the key value register 40 by the processor core 10, the cache memory control unit 20 carries out the reading of the execution codes and the data by the following procedure.

<Reading of the Execution Codes and the Data>

Figure 3:
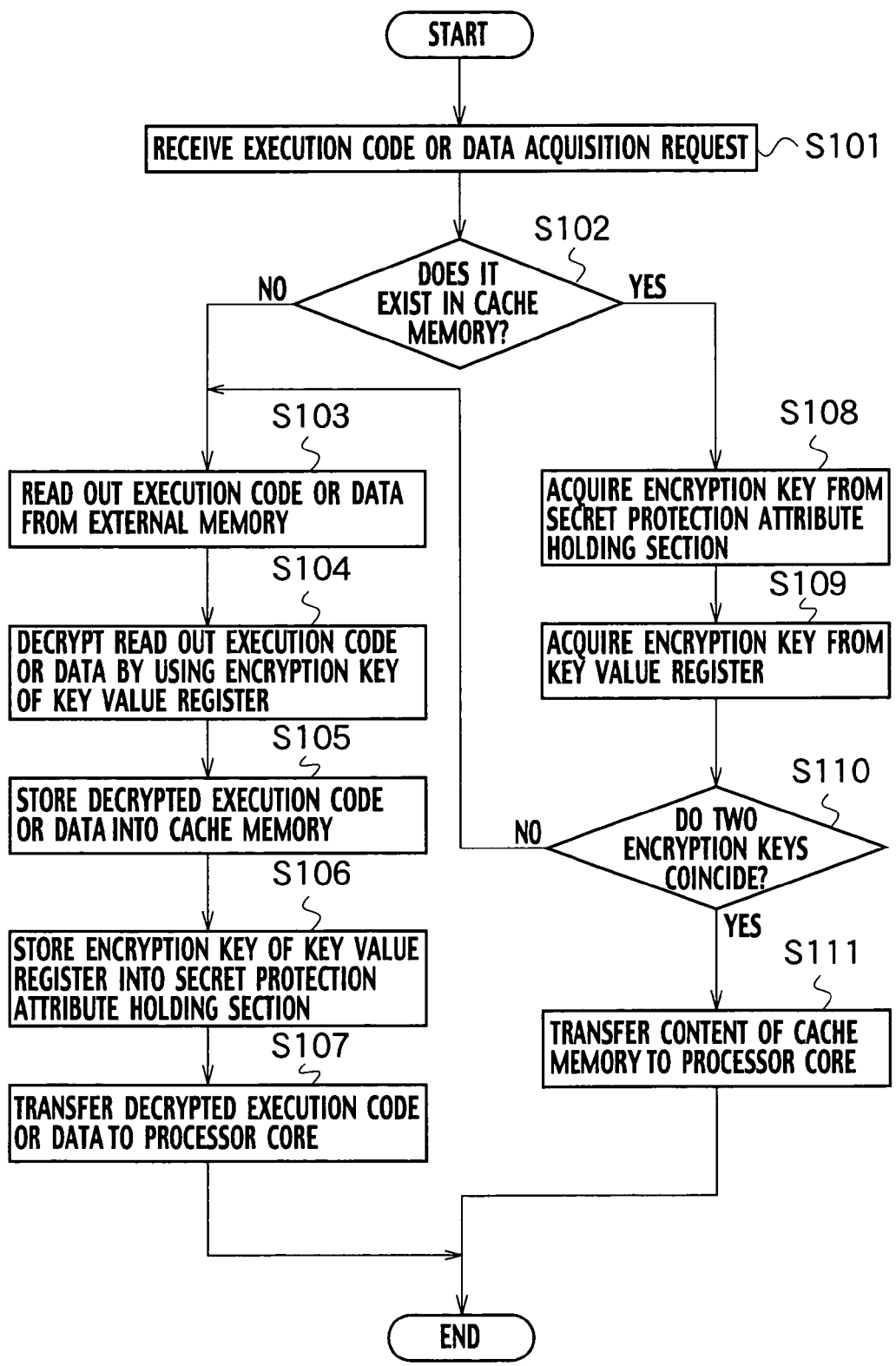
FIG. 3 is a flow chart showing a procedure for reading the execution code and data by the tamper resistant microprocessor of FIG. 1.

The operation of the tamper resistant microprocessor 100 of this embodiment for reading out the execution codes or the data of the encrypted program from the memory device 60 or the cache memory 21 will be described with reference to FIG. 3.

(a) First, the cache memory control unit 20 receives an execution code or data acquisition request from the processor core 10 at the step S101, and judges whether this execution code or data exists on the cache memory 21 or not, as the first confirmation, at the step S102.

(b) In the case where it is judged that the execution code or data of the address to be executed does not exist on the cache memory 21, the execution code or data of that address is read out from the memory device 60 through the bus 70 and the external bus interface 50, at the step S103.

(c) At the step S104, the code data encryption/decryption processing unit 30 decrypts the execution code or data read out from the memory device 60, by using the encryption key in the key value register 40 that is set by the initial setting.

(d) At the step S105, this execution code or data is transferred to the cache memory 21, and stored into one of the data regions 24a to 24d on the cache lines 22a to 22d of FIG. 2. At this point, at the step S106, the information regarding the address from which the execution code or data is read out is stored into one of the tag regions 23a to 23d, and the content in one of the control information holding sections 26a to 26d is updated. Also, the encryption key in the key value register 40 that is used in decrypting the execution code or data is stored in one of the secret protection attribute holding sections 25a to 25d. The decrypted execution code or data is also transferred to the processor core 10 for execution, at the step S107.

(e) On the other hand, when it is judged that the execution code or data at an address to be executed exists on the cache memory 21 by the first confirmation at the step S102, the cache memory control unit 20 carries out the second confirmation as follows. Namely, the encryption key is acquired from the secret protection attribute holding section 25 in the cache line 22 of the execution code or data at an address to be executed, among the secret protection attribute holding sections 25a to 25d in the cache lines 22a to 22d at the step S108, and the encryption key is acquired from the key value register 40 which stores the encryption key unique to the program for which the processing is currently executed, at the step S109. Then, at the step S110, these encryption keys are compared. When these two encryption keys coincide, the use of the content of the execution code or data that already exists in the cache memory 21 as the execution code or data at an address to be executed is permitted. Then, at the step S111, the execution code or data existing in the data region 24 of the cache line 22 is transferred to the processor core 10.

When the two encryption keys do not coincide at the step S110, the use of the content in the cache memory 21 is not permitted to the currently executed program, and the operation of the steps S103 to S107 are carried out similarly as in the case where the execution code or data at an address to be executed does not exist in the cache memory 21. It is also possible to interrupt the execution of the program and generate an exception indicating the abnormal finish.

As a concrete example of the operation of the tamper resistant microprocessor 100 described above, the operation by the tamper resistant microprocessor 100 for executing the program #1 and the program #2 of FIG. 5 will be described. At a time of executing the program #1 and the program #2, there are four possible cases including the case where the program #2 is executed after the program #1 is finished (Case #1), the case where the program #2 is executed by interruption during the execution of the program #1 (Case #2), the case where the execution codes or data are executed within the same program (Case #3), and the case where the execution codes or data are executed between different programs (Case #4). In the following, each one of these cases will be described in detail.

(Case #1)

Figure 6:
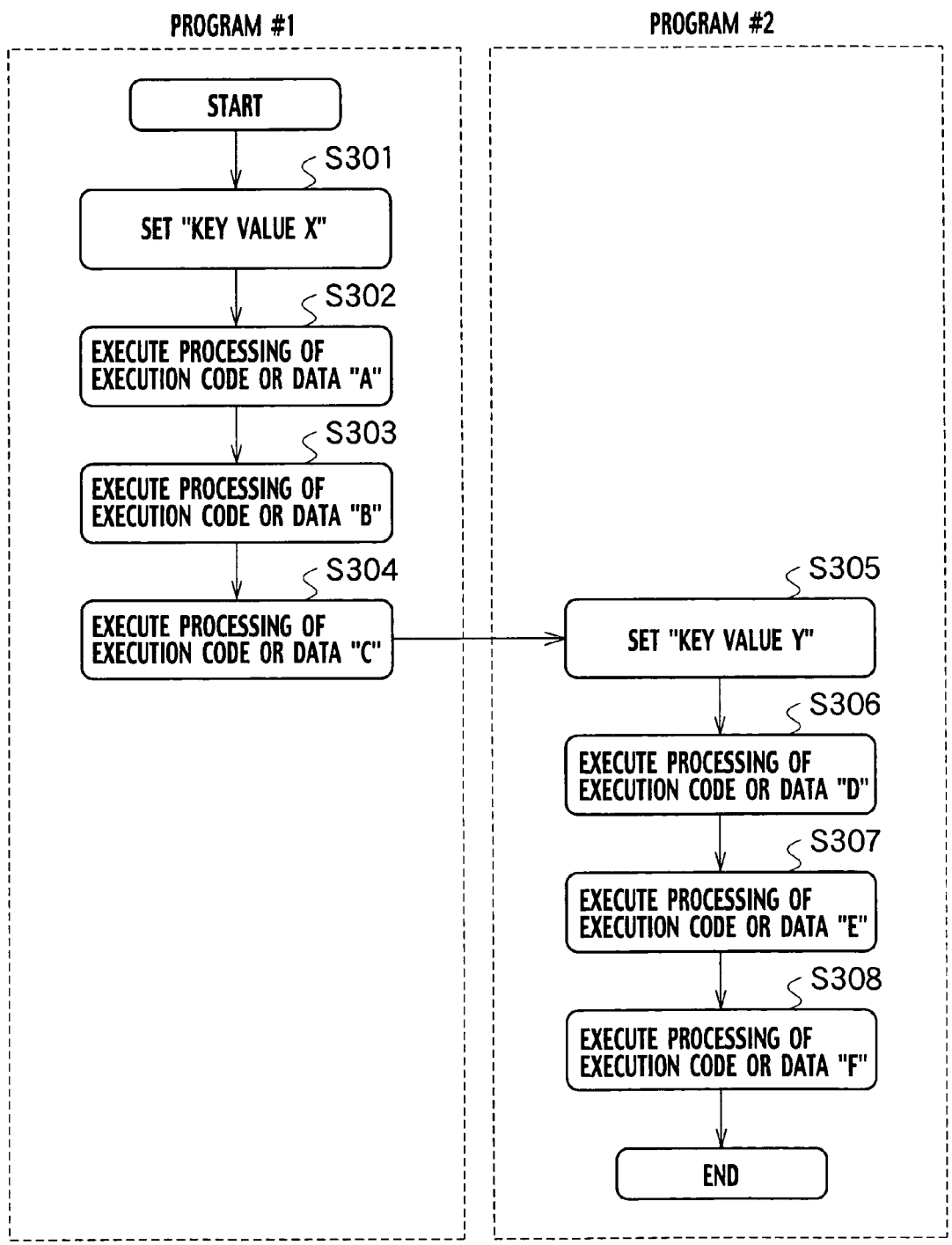
FIG. 6 is a flow chart showing the case #1 of reading out the execution code by the tamper resistant microprocessor of FIG. 1.

First, as the ordinary processing, the case where the program #2 is executed after the program #1 is finished will be described with reference to FIG. 6.

(a) First, the tamper resistant microprocessor 100 sets the "key value X" to the key value register 40 as the initial setting of the program #1 at the step S301. Then, the execution code or data "A" of the program #1 is called up from the memory device 60, decrypted by using the "key value X" and stored into the cache line 22a of FIG. 2, at the step S302. At this point, the "key value X" is stored in the secret protection attribute holding section 25a. Also, the execution code or data "A" is processed at the processor core 10. The processor core 10 also carries out the similar processing with respect to the execution code or data "B" and "C" by advancing a program counter (not shown) one by one, at the steps S303 and S304.

(b) When the program #1 is completed, the processing of the program #2 that has been waiting is carried out. At the step S305, the "key value Y" is set to the key value register 40 as the initial setting of the program #2. Then, the execution code or data "D" of the program #2 is called up from the memory device 60, decrypted by using the "key value Y" and stored into the cache line 22d of FIG. 2, at the step S306. At this point, the "key value Y" is stored in the secret protection attribute holding section 25d. Also, the execution code or data "D" is processed at the processor core 10. The processor core 10 also carries out the similar processing with respect to the execution code or data "E" and "F" by advancing a program counter (not shown) one by one, at the steps S307 and S308.

In this case #1, the encrypted programs #1 and #2 are converted into the plaintext by using the encryption keys such that the eavesdropping and the alternation by the malicious third person can be prevented and the programs can be executed safely.

(Case #2)

Figure 7:
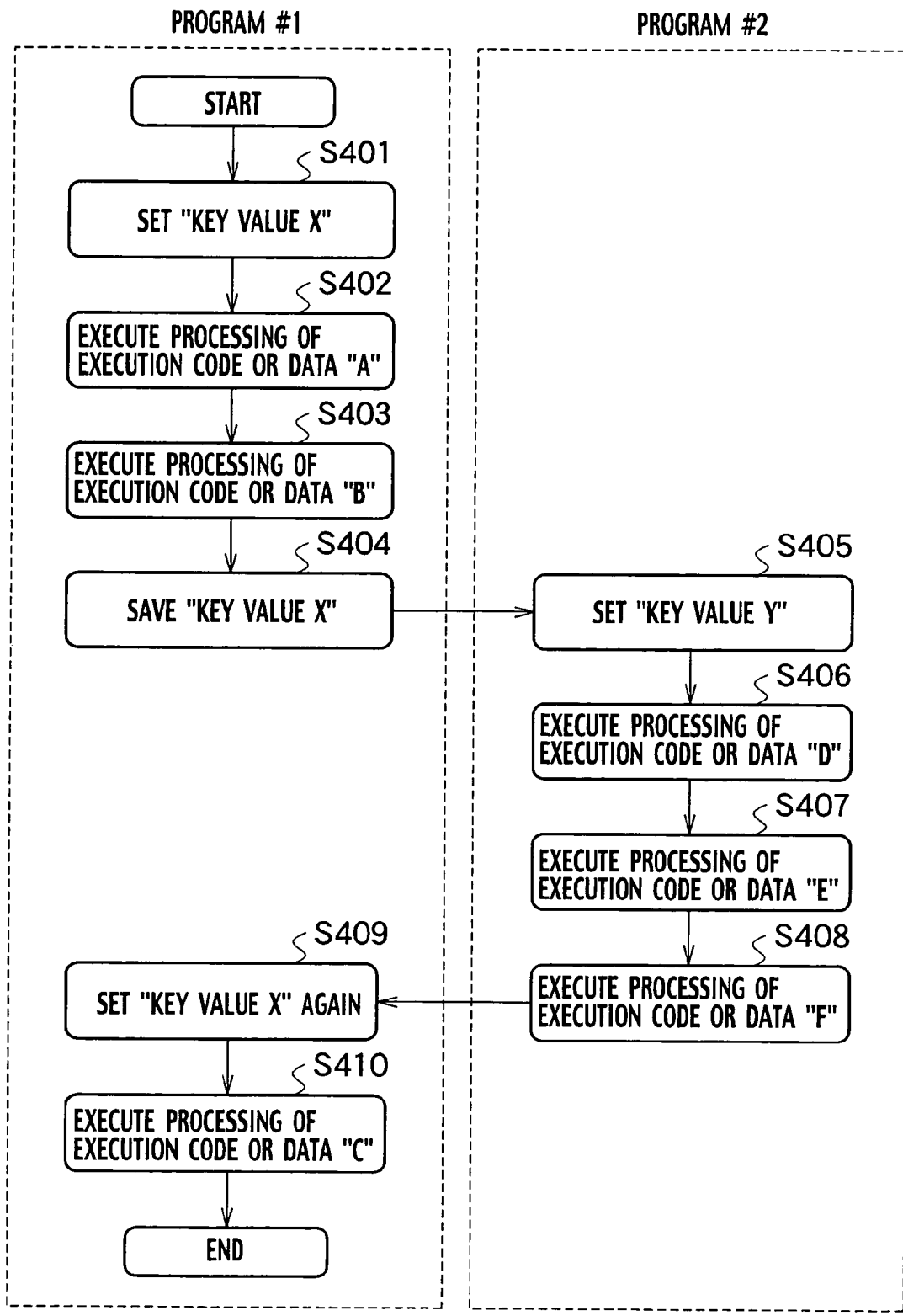
FIG. 7 is a flow chart showing the case #2 of reading out the execution code by the tamper resistant microprocessor of FIG. 1.

Next, the case where the program #2 is executed by interruption during the execution of the program #1 will be described with reference to FIG. 7.

(a) First, the tamper resistant microprocessor 100 sets the "key value X" to the key value register 40 as the initial setting of the program #1 at the step S401. Then, the execution code or data "A" of the program #1 is called up from the memory device 60, decrypted by using the "key value X" and stored into the cache line 22a of FIG. 2, at the step S402. At this point, the "key value X" is stored in the secret protection attribute holding section 25a. Also, the execution code or data "A" is processed at the processor core 10. The processor core 10 also carries out the similar processing with respect to the execution code or data "B" by advancing a program counter (not shown) one by one, at the step S403.

(b) The interruption by the program #2 occurs during or after the processing of the execution code or data "B". At the step S404, the cache memory control unit 20 saves the "key value X" as the ordinary context saving.

(b) At the step S405, the "key value Y" is set to the key value register 40 as the initial setting of the interrupting program #2. Then, the execution code or data "D" of the program #2 is called up from the memory device 60, decrypted by using the "key value Y" and stored into the cache line 22d of FIG. 2, at the step S406. At this point, the "key value Y" is stored in the secret protection attribute holding section 25d. Also, the execution code or data "D" is processed at the processor core 10. The processor core 10 also carries out the similar processing with respect to the execution code or data "E" and "F" by advancing a program counter (not shown) one by one, at the steps S407 and S408.

(d) When the program #2 is finished, the interrupted program #1 resumes its processing. The saved "key value X" is set to the key value register 40 again at the step S409, and the processing of the execution code or data "C" of the interrupted program #1 is resumed at the step S410.

In this case #2, the encryption keys for decrypting the encrypted programs #1 and #2 are saved as the context, so that it is possible to realize the multi-task program execution environment in which a plurality of programs are executed simultaneously in a pseudo-parallel manner.

(Case #3)

Figure 8:
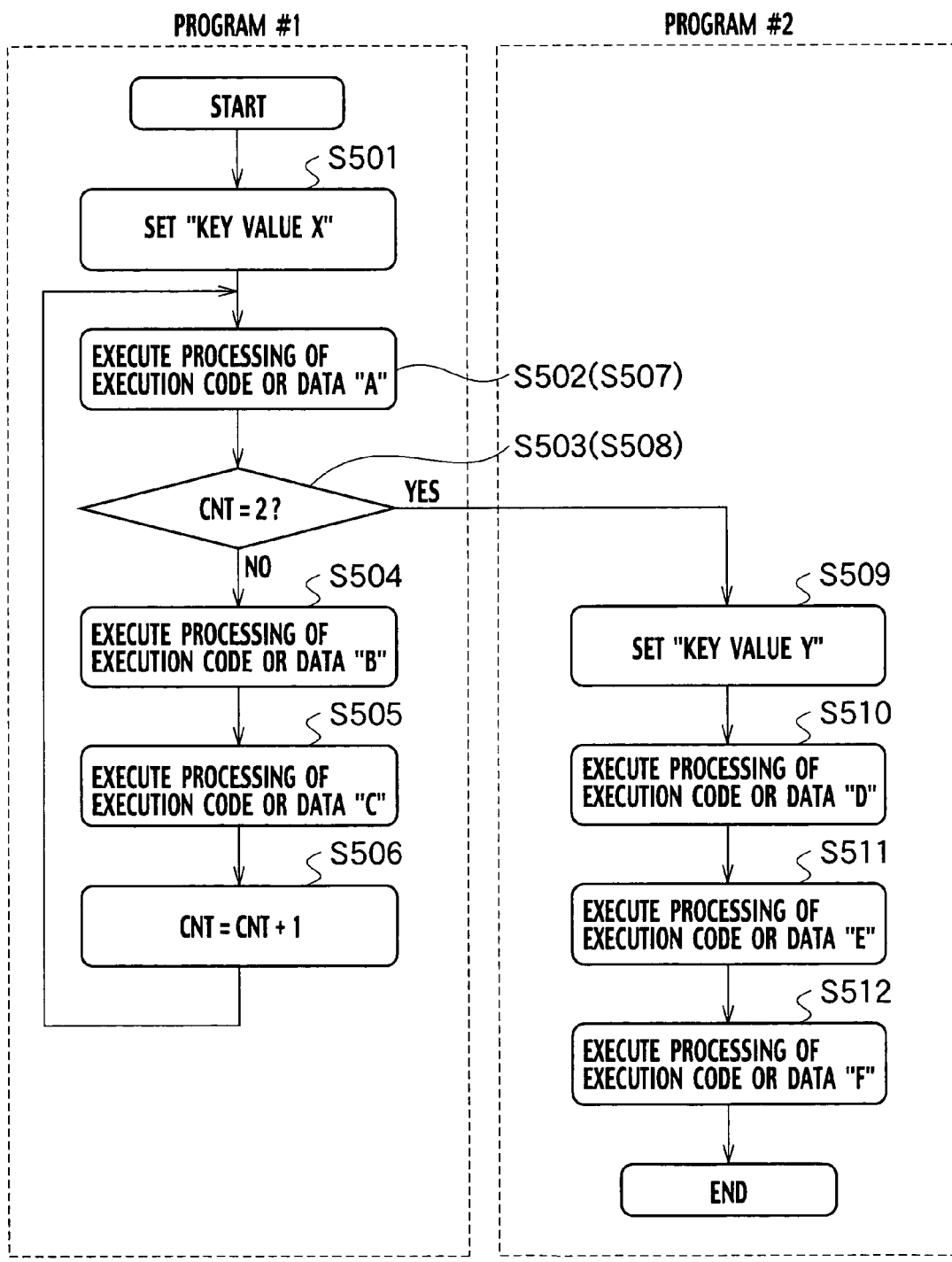
FIG. 8 is a flow chart showing the case #3 of reading out the execution code by the tamper resistant microprocessor of FIG. 1.

Next, the case where the execution codes or data "A", "B", "C" and "A" are executed within the program #1 of FIG. 5 will be described with reference to FIG. 8. Here, an initial value of a variable CNT is assumed to be "1".

(a) First, the tamper resistant microprocessor 100 sets the "key value X" to the key value register 40 as the initial setting of the program #1 at the step S501. Then, the execution code or data "A" of the program #1 is called up from the memory device 60, decrypted by using the "key value X" and stored into the cache line 22a of FIG. 2, at the step S502. At this point, the "key value X" is stored in the secret protection attribute holding section 25a. Also, the execution code or data "A" is processed at the processor core 10. The processor core 10 also carries out the similar processing with respect to the execution code or data "B" by advancing a program counter (not shown) one by one, at the steps S504 and S505.

(b) At the step S506, the variable CNT is incremented by one, and the processing of the step S502 is carried out again as the step S507. At this point, the key value register 40 stores the "key value X" and the value of the secret protection attribute holding section 25a for the execution code or data "A" is also the "key value X", so that the cache memory control unit 20 permits the use of the execution code or data "A" existing in the cache memory 21, and the execution code or data "A" existing in the cache memory 21 is transmitted to the processor core 10 again.

(c) When the program #1 is completed, a branching command is issued and the processing of the program #2 that has been waiting is started, at the step S508. The processing of the program #2 at the steps S509 to S512 is the same as the steps S305 to S308 described above.

In this case #3, the execution code or data already existing in the cache memory 21 can be used within the program having the same encryption key, i.e., the identical program, so that the processing efficiency can be improved.

(Case #4)

Figure 9:
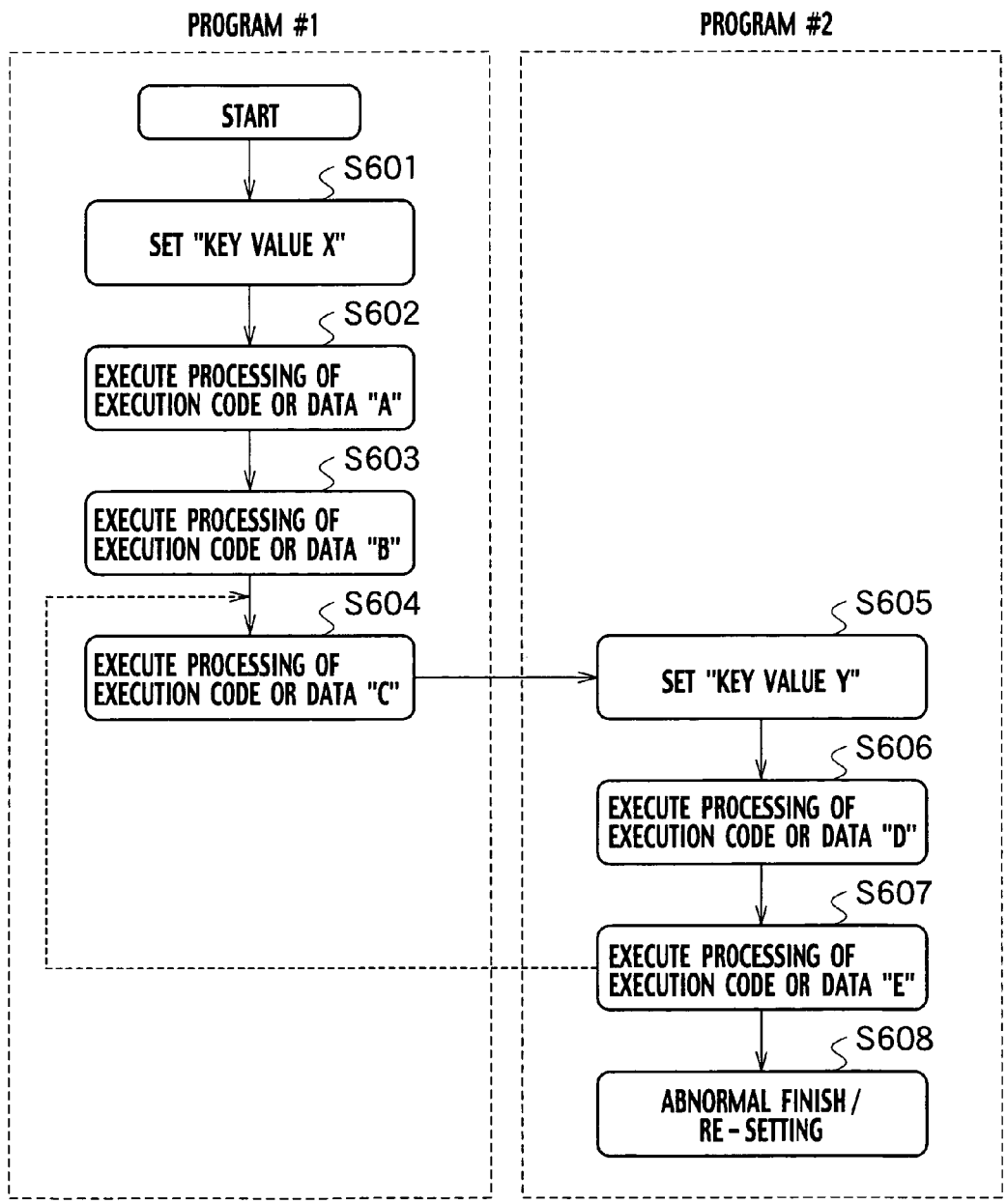
FIG. 9 is a flow chart showing the case #4 of reading out the execution code by the tamper resistant microprocessor of FIG. 1.

Finally, the case where the execution codes or data are executed between the program #1 and the program #2 of FIG. 5 will be described with reference to FIG. 9.

(a) First, the tamper resistant microprocessor 100 carries out the initial setting of the program #1 and the processing regarding the execution codes or data "A", "B" and "C" at the steps S601 to S604. These processings are the same as those of the steps S301 to S304 described above.

(b) When the program #1 is completed, the processing of the program #2 that has been waiting is carried out. At the step S605, the "key value Y" is set to the key value register 40 as the initial setting of the program #2. Then, the execution code or data "D" of the program #2 is called up from the memory device 60, decrypted by using the "key value Y" and stored into the cache line 22d of FIG. 2, at the step S606. At this point, the "key value Y" is stored in the secret protection attribute holding section 25d. Also, the execution code or data "D" is processed at the processor core 10. The processor core 10 carries out the processing by advancing a program counter (not shown) one by one.

(c) At the step S607, the execution code or data "E" to be processed next is assumed to be related to the execution code or data "C" by a JUMP command or a GOTO command. In this case, the cache memory control unit 20 judges whether the execution code or data "C" exists in the cache memory 21 or not. Here, it is assumed that the execution code or data "C" exists in the cache line 22c of the cache memory 21, for example, as the program #2 is executed immediately after the program #1. Next, the cache memory control unit 20 compares the current "key value Y" of the key value register 40 and the "key value X" stored in the secret protection attribute holding section 25c. In this case, the key values do not coincide, so that the cache memory control unit 20 does not permit the use of the cache line 22c in the cache memory 21, and then the execution code or data "C" is acquired by the procedure of the steps S103 to S107 or the execution of the program #2 is interrupted and the abnormal finish is indicated, at the step S608.

In this case 4, the use of the execution code or data in the cache memory is not permitted between programs having different encryption keys, i.e., a plurality of different programs. In this way, there is no need for scanning the entire region of the cache memory at a time of finishing one program, so that the processing efficiency can be improved.

<Data writing>

Figure 4:
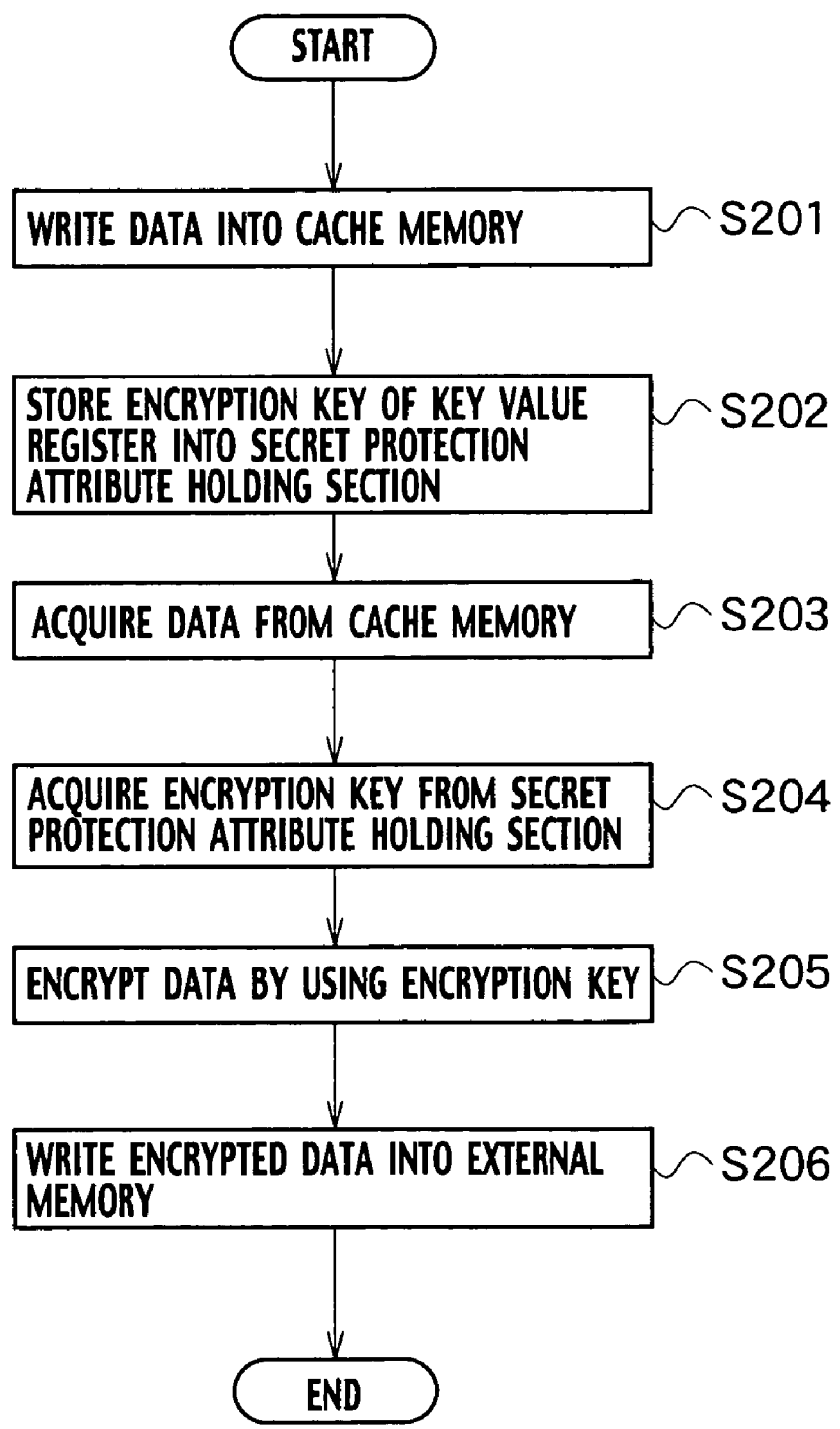
FIG. 4 is a flow chart showing a procedure for writing the data by the tamper resistant microprocessor of FIG. 1.

The operation by the tamper resistant microprocessor 100 of this embodiment for writing the data into the cache memory 21 and the memory device 60 in response to a request of the program will be described with reference to FIG. 4.

(a) First, at the step S201, the cache memory control unit 20 acquires the data to be written in plaintext form into the cache memory 21 from the processor core 10, and stores it into the corresponding one of the data regions 24a to 24d of the cache lines 22a to 22d of FIG. 2.

(b) At the step S202, the information regarding an address into which the data is to be written is stored in the corresponding one of the tag regions 23a to 23d, and the content of the corresponding one of the control information holding sections 26a to 26d is updated. Also, the encryption key to be used in writing this data into the memory device 60 is read out from the key value register 40 and stored into the corresponding one of the secret protection attribute holding sections 25a to 25d.

(c) Next, the data is written from the cache memory 21 into the memory device 60. This operation becomes necessary in the case of storing another data into the corresponding one of the cache lines 22a to 22d. More specifically, the cache memory control unit 20 acquires the plaintext data from the corresponding one of the data regions 24a to 24d in the cache lines 22a to 22d at the step S203, and acquires the encryption key from the corresponding one of the secret protection attribute holding sections 25a to 25d at the step S204. These plaintext data and encryption key are transferred to the code data encryption/decryption processing unit 30.

(d) At the step S205, the code data encryption/decryption processing unit 30 encrypts the plaintext data by using the encryption key. At the step S206, the encrypted data is written into the memory device 60 through the external bus interface 50 and the bus 70.

According to the above described processing, the data processed and changed by the tamper resistant microprocessor 100 are encrypted by using the encryption key in the secret protection attribute holding section. For this reason, the eavesdropping or the alteration by the malicious third party can be prevented, and data given to the memory device in a safe state can be transmitted to a desired device or network.

According to the tamper resistant microprocessor of this embodiment, the key value table is unnecessary at a time of making an access to the cache memory, so that the first problem noted above regarding a limitation on the number of programs that can be simultaneously activated can be avoided.

When one program is finished, the cache memory used by that program cannot be read out without knowing the value of the encryption key possessed by that program. For this reason, even if another program is activated while the contents of the cache memory are unchanged, there is no possibility for that another program to read out the contents. so that there is no need to scan the entire region of the cache memory for the purpose of invalidating the contents. As a result, the second problem noted above regarding the entire region scan time can be eliminated, so that the program execution speed can be improved.

In the case where a plurality of programs share one encryption key, any of these programs can look up the contents of the cache memory by using the shared encryption key, and when the content written by one program is to be read out by another program, there is no need to encrypt that content once and write it into the memory device such as the main memory. For this reason, the third problem noted above regarding the lowering of the program execution speed by the extra encryption and decryption processing can be avoided.

According to the data access control method using this tamper resistant microprocessor, there is no need for functions such as a function for looking up the key value table and a function for scanning the cache region and invalidating it at a time of finishing the program, unlike the method using the key value table, so that the fourth problem noted above regarding the complication of the hardware can be avoided, and thereby the manufacturing cost can be lowered.

According to the present invention, it is possible to provide a data access control method by a tamper resistant microprocessor and a cache memory implemented processor, for limiting accesses with respect to the cache memory, in which there is no limit to the number of programs that can be activated simultaneously, the contents of the cache memory used by one finishing program can be made impossible to read from the other program without scanning the entire region of the cache memory, the contents written into the cache memory by one program can be read by the other program without encrypting it and writing it into the main memory when a plurality of programs read and write the shared memory region by sharing one encryption key, and the complicated hardware functions are unnecessary.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A tamper resistant microprocessor that executes a plurality of programs in parallel under a multi-task programming environment, comprising:
    a decryption unit configured to read out an execution code or data of one of a plurality of encrypted programs and decrypt the execution code or data by using a prescribed encryption key corresponding to the read-out encrypted program, according to a decryption request from a cache memory control unit;
    a cache memory configured to store the execution code or data decrypted by the decryption unit and an actual encryption key used in decrypting the execution code or data for at least one cache line, the actual encryption key being stored in a secret protection attribute holding section of at least one cache line, the execution code or data stored in the cache memory remaining even after each program terminates; and
    the cache memory control unit configured to process a reading request for the execution code or data to be acquired from the decryption unit or the cache memory such that, if the execution code or data exists in the cache memory and the actual encryption key stored in the secret protection attribute holding section of a cache line that stores the existent execution code or data is identical with the prescribed key corresponding to a program that issues the reading request, the execution code or data in the cache memory is read out, and if the execution code or data does not exist in the cache memory or the actual encryption key is not identical with the prescribed key, the execution code or data is read out from an external memory device.

2. The tamper resistant microprocessor of claim 1, further comprising:
    a key value register configured to store the prescribed encryption key, which is updated at an occasion of executing each encrypted program;
    wherein the cache memory control unit judges whether the contents of the actual encryption key stored in the secret protection attribute holding section of a cache line that stores the existent execution code or data is identical with the contents of the prescribed key stored in the key value register.

3. The tamper resistant microprocessor of claim 2, wherein the cache memory stores data decrypted by the decryption unit, and the cache memory control unit writes a processing result of the data into the cache memory, while storing the prescribed encryption key stored in the key value register into the secret protection attribute holding section of a cache line for the data.

4. The tamper resistant microprocessor of claim 1, wherein the cache memory stores data decrypted by the decryption unit, and the cache memory control unit encrypts a processing result of the data by using the actual encryption key stored in the secret protection attribute holding section of a cache line for the data, and writes encrypted data into the external memory device.

5. A data access control method by a cache memory implemented processor that executes a plurality of programs in parallel under a multi-task programming environment, comprising:
    reading out an execution code or data one of a plurality of encrypted programs and decrypting the execution code or data by using a prescribed encryption key corresponding to the read-out encrypted program, according to a decryption request;
    storing the execution code or data decrypted by the reading and decrypting step and an actual encryption key used in decrypting the execution code or data for at least one cache line, the actual encryption key being stored in a secret protection attribute holding section of at least one cache line, the execution code or data stored in the cache memory remaining even after each program terminates; and
    processing a reading request for the execution code or data to be acquired from a decryption unit or the cache memory such that, if the execution code or data exists in the cache memory and the actual encryption key stored in the secret protection attribute holding section of a cache line that stores the existent execution code or data is identical with the prescribed key corresponding to a program that issues the reading request, the execution code or data in the cache memory is read out, and if the execution code or data does not exist in the cache memory or the actual encryption key is not identical with the prescribed key, the execution code or data is read out from an external memory device.

6. The data access control method of claim 5, further comprising:

storing the prescribed encryption key, which is updated at an occasion of executing each encrypted program, into a key value register;

wherein whether the contents of the actual encryption key stored in the secret protection attribute holding section of a cache line that stores the existent execution code or data is identical with the contents of the prescribed key stored in the key value register is judged.

7. The data access control method of claim 6, wherein the cache memory stores data decrypted by the reading and decrypting step, and the data access control method further comprises writing a processing result of the data into the cache memory, while storing the prescribed encryption key stored in the key value register into the secret protection attribute holding section of a cache line for the data.

8. The data access control method of claim 5, wherein the cache memory stores data decrypted by the reading and decrypting step, and the data access control method further comprises encrypting a processing result of the data by using the actual encryption key stored in the secret protection attribute holding section of a cache line for the data, and writing encrypted data into the external memory device.

* * * * *